(12) United States Patent
Gateman et al.

(10) Patent No.: US 9,611,018 B2
(45) Date of Patent: Apr. 4, 2017

(54) NODE DEPLOYER

(71) Applicant: MAGSEIS AS, Lysaker (NO)

(72) Inventors: Jan B. Gateman, Bekkestua (NO);
Ivar Gimse, Oslo (NO)

(73) Assignee: MAGSEIS AS, Lysaker (NO)

( * ) Notice: Subject to any disclaimer, the term of this patent is extended or adjusted under 35 U.S.C. 154(b) by 0 days.

(21) Appl. No.: 14/914,180

(22) PCT Filed: Sep. 5, 2014

(86) PCT No.: PCT/NO2014/000042
§ 371 (c)(1),
(2) Date: Feb. 24, 2016

(87) PCT Pub. No.: WO2015/034368
PCT Pub. Date: Mar. 12, 2015

(65) Prior Publication Data
US 2016/0214694 A1   Jul. 28, 2016

(30) Foreign Application Priority Data
Sep. 6, 2013 (NO) .................................. 20131195

(51) Int. Cl.
*B63G 8/00* (2006.01)
*G01V 1/38* (2006.01)

(52) U.S. Cl.
CPC ........... *B63G 8/001* (2013.01); *G01V 1/3852* (2013.01); *B63G 2008/007* (2013.01)

(58) Field of Classification Search
CPC .............. B63G 8/001; B63G 2008/002; B63G 2008/004; B63G 2008/005; B63G 2008/007; G01V 1/38; G01V 1/3843; G01V 1/3852
See application file for complete search history.

(56) References Cited

U.S. PATENT DOCUMENTS

| 4,686,906 A | 8/1987 | Meindl |
| 4,780,863 A | 10/1988 | Schoepf |

(Continued)

FOREIGN PATENT DOCUMENTS

| EP | 2712802 | 3/2014 |
| NO | 326789 | 2/2007 |

(Continued)

OTHER PUBLICATIONS

International Search Report issued in PCT/NO2014/000042 Feb. 11, 2014, pp. 1-2.

(Continued)

*Primary Examiner* — Ajay Vasudeva
(74) *Attorney, Agent, or Firm* — Jeffrey S. Melcher; Manelli Selter PLLC (57) ABSTRACT

An apparatus (100) for deploying and retrieving seismic nodes (200) comprises a towing connection (101) connecting the apparatus (100) to a towing cable (10) running from a towing vessel; vertical control means (125; 5; 120, 12) for adjusting a height over the seafloor by means of the towing cable (10); horizontal control means (125; 130-133) for adjusting a horizontal position according to the desired path and deployment and retrieval means (151; 160, 170, 180) for deploying and receiving nodes (200) connected to a wire (150) at predetermined intervals along the path. The deployment means are preferably configured to deploy the nodes (150) without substantial pull from the previously deployed wire (150).

10 Claims, 7 Drawing Sheets

(56) References Cited

U.S. PATENT DOCUMENTS

| | | | |
|---|---|---|---|
| 4,942,557 A | 7/1990 | Seriff | |
| 8,534,959 B2 * | 9/2013 | Thompson | B63C 11/00 181/122 |
| 2005/0276665 A1 | 12/2005 | Entralgo | |
| 2011/0217123 A1 | 9/2011 | Jewell | |
| 2012/0134752 A1 | 5/2012 | Eisenhower | |
| 2013/0058192 A1 | 3/2013 | Gateman | |
| 2016/0041284 A1 * | 2/2016 | Rokkan | G01V 1/3843 29/428 |

FOREIGN PATENT DOCUMENTS

| | | |
|---|---|---|
| WO | 2008/105667 | 9/2008 |
| WO | 2014/090811 | 6/2014 |
| WO | 2014/093292 | 6/2014 |

OTHER PUBLICATIONS

Written Opinion issued in PCT/NO2014/000042, Nov. 25, 2014, pp. 1-8.
International Preliminary Report on Ptentability issued in PCT/NO2014/000042, Feb. 11, 2014, Mar. 17, 2016, pp. 1-6.

* cited by examiner

NODE DEPLOYER

The present invention generally concerns seismic surveys, and more particularly an apparatus for deploying and retrieving an ocean bottom cable comprising several seismic nodes.

A seismic survey at sea involves s firing an array of acoustic sources, for example airguns, at a known position in a so-called shot. Acoustic waves from the airguns travel through the water into a subterranean formation, where they are reflected and refracted from various layers in the formation. The reflected and refracted waves are detected and recorded for later analysis in order to provide information about the subterranean structure or formation.

In order to detect as much as possible of the reflected and refracted waves, seismic sensors such as geophones have to be planted in close acoustic contact with the seafloor, and hydrophones in a position just above the seafloor. The seismic sensors are conventionally arranged in nodes, each node comprising one or more seismic sensors.

In order to perform such a seismic survey, an array of nodes is deployed on the seafloor. The array may be arranged as a rectangular grid with a node at each crossing. Typical distances are 25 or 50 meters between adjacent nodes along a line and 100 to 400 meters between the lines. When the nodes are deployed, a source vessel towing acoustic sources fires a series of shots at known positions. The seismic response signals from each shot are detected at each node of the array. Each node may perform some signal processing. When the desired shots are performed, the nodes are retrieved and stored for deployment in the next survey.

The nodes may be deployed or planted one by one, e.g. by a Remotely Operated Vehicle (ROV), or they may be connected by an Ocean Bottom Cable (OBC), typically at intervals of 12.5, 25 or 50 meters. An OBC facilitates retrieval, as single, small nodes might otherwise be difficult to locate or collect. Several OBCs may be deployed parallel to each other such that the nodes form the desired array on the seafloor.

An OBC may also provide communication lines such that each node can transmit seismic data to a survey vessel in real-time. Examples can be found, for example, in U.S. Pat. Nos. 4,942,557 and 4,780,863. One shortcoming of these methods and devices is that a communication line must pass through a housing from the sensors and controllers in the node to a transceiver or receiver on the survey vessel. When the depth of deployment increases, either the risk of leakage through the opening for the communication line increases or the cost of sealing the housing increases. Another shortcoming is that a cable stretching from the seafloor to the surface may induce motion, vibrations and other noise that disturb the measurements taken by the seismic sensors within the nodes.

To overcome these shortcomings, each node may be autonomous, i.e. remain incommunicado with the survey vessel for the duration of a survey. An autonomous seismic node comprises seismic sensors, a recorder, a memory for storing the seismic signals and a power source, e.g. a battery pack, to supply the node with power during the survey. After retrieval, the seismic data are transferred to the survey vessel for later analysis.

U.S. patent application 2013/0058192 to Gateman et al. and assigned to the applicant for the present disclosure discloses an ocean bottom seismic cable with autonomous node capsules that are inserted into corresponding casings mounted along the OBC cable. In this application, the OBC(s) is/are deployed from a vessel, and thus subject to vertical forces caused by several nodes, each having negative buoyancy, suspended from the vessel. As the nodes are disposed at regular intervals along the OBC, the vertical forces increase with the depth to the seafloor. In addition, an OBC suspended from a vessel is subject to horizontal forces from underwater currents. As the depth increases, these forces are likely to cause deviations from a desired path on the seafloor.

However, in order to estimate the depth of a reflecting layer from a time delay between a shot and the response, the distance between the source and node must be known. Hence, the node positions must be accurate in order to provide an accurate image of the formation. Further, fixed intervals between adjacent nodes minimizes errors when interpolating seismic data because an interpolated value between two adjacent nodes far apart is less accurate than an interpolated value between two adjacent nodes close to each other. Hence, nodes should be deployed at regular intervals at known locations in order to obtain the best possible survey with a predetermined number of nodes. The ability to position the seismic nodes with high accuracy at the seafloor are also very important for seismic surveys that are repeated in time over the same survey area, e.g. 4D surveys.

While a wire connecting the nodes determines the distance between nodes, it does not ensure that the nodes are deployed along a predetermined path, e.g. along a straight line rather than in a zig-zag pattern. As noted, horizontal forces caused by underwater currents make it difficult to control deployment by manipulating the OBC from the surface.

A similar problem with controlling a cable from the surface is encountered when surveying the seafloor using cameras, side scanning radars etc. NO 326789 B1 discloses a Remotely Operated Survey Platform (ROSP), which is a submersible survey platform towed by a vessel and controlled to maintain a predetermined height over the seafloor and a predetermined lateral position with respect to the intended path of the cable. The vertical motion is provided by a winch connected to the towing cable, and the horizontal motion required to adjust the course of the ROSP to the course of the towing vessel is provided by side thrusters. Thus, the ROSP is a less expensive and more specialised device than a general purpose ROV. It may advantageously be designed as an open frame, and may carry a heavier load then an ROV as the towing cable easily may provide a larger vertical force than a vertical thruster on a general purpose ROV. Features known from NO 326789 B1 appear in the preamble of claim 1.

For purposes of the present invention, it should be understood that releasable clamping devices for attaching and releasing an object from a running wire are well known from the general field of rope conveyors. Some examples involve a snap locking mechanism wherein the conveying rope is put between a pair of rollers disposed in a funnel shaped conduit. Friction between the rope and the rollers pulls the rollers toward the narrower end of the funnel to increase the grip on the rope. A pull or tug in the opposite direction causes the rollers to return to a broader part of the funnel such that their grip on the conveying rope is removed.

U.S. Pat. No. 4,686,906 assigned to Doppelmayr discloses an example of a clamping device for a ski lift that might be adapted for use in the present invention. The clamping device comprises a powerful spring operated gripping jaw that can be attached to and detached from a continuously running wire at a terminal by purely mechanical means, a guiding rail to prevent undesired pivoting and a safety spring that operates a lever if the gripping force becomes too small.

Thus, using known techniques for rope conveyors, an autonomous node can be provided with a clamping device attaching or detaching the node at a terminal and a safety mechanism may prevent deployment of a node if insufficient gripping force is provided by the clamping device.

An objective of the present invention is to provide an improved apparatus for deploying nodes at a seafloor while retaining the benefits of prior art.

SUMMARY OF THE INVENTION

This is achieved by an apparatus according to claim 1.

More particularly, the invention concerns an apparatus for deploying nodes along a desired path at a seafloor, the apparatus comprising: a connection to a towing cable connected to a towing vessel; vertical control means for adjusting a height over the seafloor by means of the towing cable; and horizontal control means for adjusting a horizontal position according to the desired path. The apparatus further comprises deployment and retrieval means for deploying nodes connected to a wire at predetermined intervals along the path.

The vertical and horizontal control means are disclosed in NO 326789 B1. In particular, the vertical control means measure a distance to the seafloor and input the measurement to a controller located aboard the towing vessel or within the apparatus. The controller adjusts the height either by controlling a winch aboard the towing vessel or a winch within the apparatus. The controller adjusts the horizontal position by operating the thrusters depending on inputs from inertial navigation systems etc. Advantageously, the towing cable comprises a stress member, a power line and one or more communication lines for measurements and control signals.

In a first embodiment of the present invention, the deployment and retrieval means is a guiding frame. The wire with nodes at predetermined intervals is supplied from the towing vessel, and runs through the guiding frame in a direction substantially parallel to the desired path. That is, the OBC is received at the front end of the guiding frame and leaves the guiding frame at the back with respect to the towing direction. The guiding frame is controlled by the apparatus to follow the predetermined path as described.

If desired, several guiding frames can be arranged beside each other to deploy several wires parallel to each other, each wire connecting several nodes. This reduces the number of passes, and hence time and energy, required for the towing vessel to deploy an array of nodes at the seafloor.

In a second embodiment, the deployment and retrieval means comprises a rotatable drum with the wire attached thereto, such that the wire is spooled off the drum when the drum is rotating in a deploying direction and the line is spooled on to the drum when the drum is rotated in a retrieving direction. If a winch for adjusting vertical position is disposed on the submersible apparatus, the rotatable drum and the winch for adjusting vertical position are independent of each other.

In some embodiments with a rotatable drum, the nodes are permanently connected to the wire, and spooled on and off the rotatable drum along with the wire.

A preferred embodiment comprises at least one node store adapted to receive several nodes and a connecting device for connecting the nodes to the wire during deployment and disconnecting the nodes from the wire during retrieval. The connecting device fetches the nodes one by one from the node store during deployment and stores the nodes one by one in the node store during retrieval. In embodiments with one or more node stores, the rotatable drum deploying or retrieving wire may be disposed on the towing vessel or within the apparatus.

Further features and advantages of the invention will appear from the dependent claims and the detailed description of a preferred embodiment below.

BRIEF DESCRIPTION OF THE DRAWINGS

The invention will be explained with reference to an exemplary embodiment and the accompanying drawings, in which.

DETAILED DESCRIPTION OF A PREFERRED EMBODIMENT

The drawings are intended to illustrate the principles of the present invention, and may not be to scale. For example, FIG. 1 schematically illustrates a towing vessel 1 deploying nodes 200, wherein the nodes 200 are depicted very large compared to the vessel 1 for illustrative purposes.

For convenience, the term "wire" is used consistently for the cable, rope, line or wire to which the nodes are connected. However, in some applications the nodes can be connected, attached to or detached from, for example, a synthetic rope. Thus, the term "wire" is not limited to a steel wire.

Figure 1:
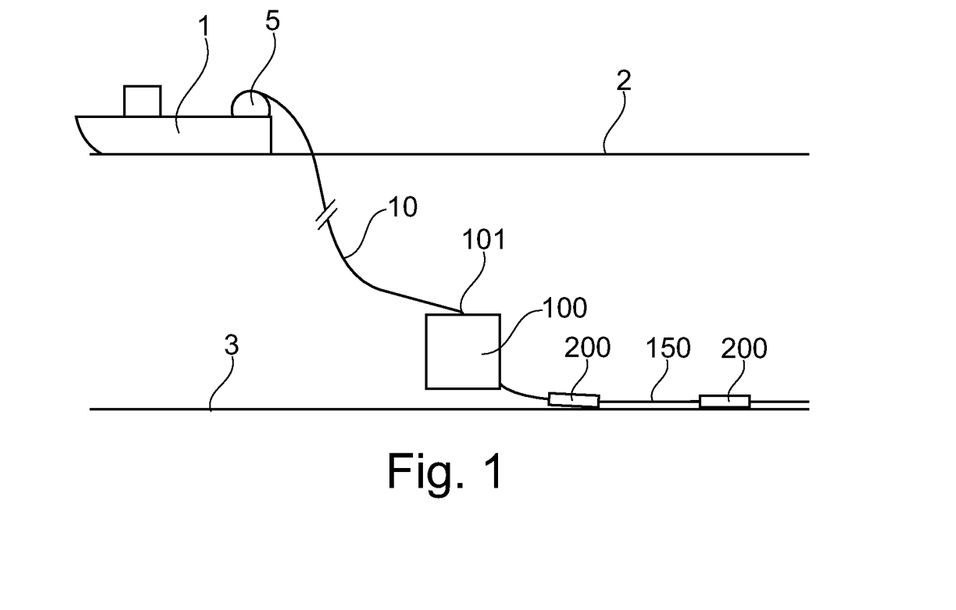
FIG. 1 is a schematic view of a method employing an apparatus according to the present invention.

On FIG. 1, the towing vessel 1 is moving on a water surface 2 from right to left at a predetermined course. A towing cable 10 is connected to a winch 5 on the vessel 1, and may be deployed or retrieved by rotating the winch 5 in a conventional manner. The distal end of the towing cable 10 is connected to an apparatus 100 according to the invention at a towing connector 101. The apparatus 100 is kept at a predetermined height from the seafloor 3 and at a predetermined path, e.g. one matching the path of the towing vessel 1. The apparatus 100 deploys a wire 150 connecting several autonomous nodes 200, each of which is incommunicado with the other nodes 200, the apparatus 100 and the vessel 1, and each of which is capable of detecting, recording and storing seismic signals as described briefly in the introduction. Thus, the wire 150 does not need to provide communication, and can serve two simple purposes: 1) ensuring a predetermined distance between the nodes 200, and 2) facilitate retrieval of the nodes 200, which are small and might otherwise be hard to locate at the sea floor.

Figure 2:
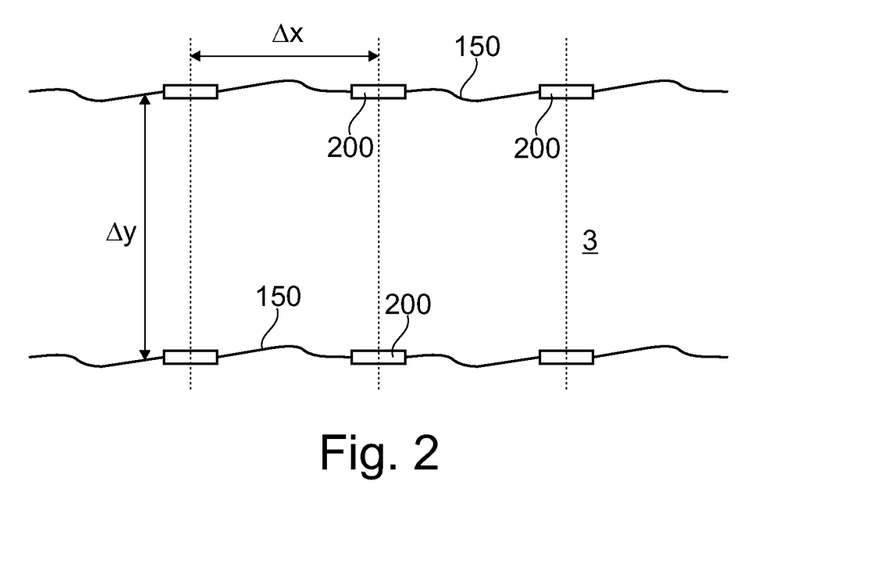
FIG. 2 illustrates a patch of seismic nodes deployed by the apparatus.

FIG. 2 illustrates a patch or array of seismic nodes 200 deployed at the ocean floor 3 by the apparatus 100. For simplicity, only a part of the patch is shown. As noted in the introduction, nodes 200 are attached to wires 150 with a typical distance $\Delta x$ in the range 25 to 50 meters between each node. A line comprising a wire and several nodes may typically be 10 to 20 km long. Further, wires 150 are arranged roughly parallel to each other with a distance $\Delta y$, typically 100 to 400 meters, between each line.

The wire 150 extending between nodes 200 is depicted as a slightly curved line to illustrate that there is little or no tension in the wire when the nodes 200 are resting on the ocean floor 3. This may serve to decrease any acoustic noise carried along the wire 150 between the nodes 200. In a preferred embodiment of the present invention, the nodes 200 are thus pushed out of the apparatus 100 (FIG. 1) during deployment rather than being pulled out by the wire 150.

The present invention is designed for depths of 1 000-3 000 meters or more. During deployment, the apparatus 100 is maintained, for example, a few meters over the seafloor and steered to its desired position from the towing vessel. The actual path of the towing cable 10 through several kilometers of water to the bottom thus becomes irrelevant. During retrieval, a main concern is to avoid dragging the nodes 200 along the seafloor to avoid loss and damage. For this end, it may be beneficial to maintain the apparatus 100 somewhat higher above the seafloor 3 than during deployment, as a greater height allows a greater lateral deviation from a deployed line while still pulling the node approximately vertically off the seafloor. A longer line needs to suspend a larger number of nodes at fixed intervals. On the other hand, it is desirable to employ a wire 150 that is as thin as possible in order to limit the space required for storage and transport and in order to minimize acoustic coupling between the nodes 200. While the exact balance between the desire for a long and strong wire and a thin wire 150 is yet to be determined, it is believed that a wire with diameter in the range 4-16 mm and a height over the seafloor 3 during retrieval in the range 50-100 meters would prove cost efficient. It is also noted that a height 50-100 meters above the seafloor during retrieval permits less accurate positioning and thus faster retrieval of the nodes.

For the sake of order, it is noted that the vessel 1 and apparatus 100 used for retrieval need not be the same vessel and apparatus that were used for retrieval, and that any method for deployment, shooting and retrieval known in the art, e.g. patch or rolling, may be employed with the present invention.

Figure 3:
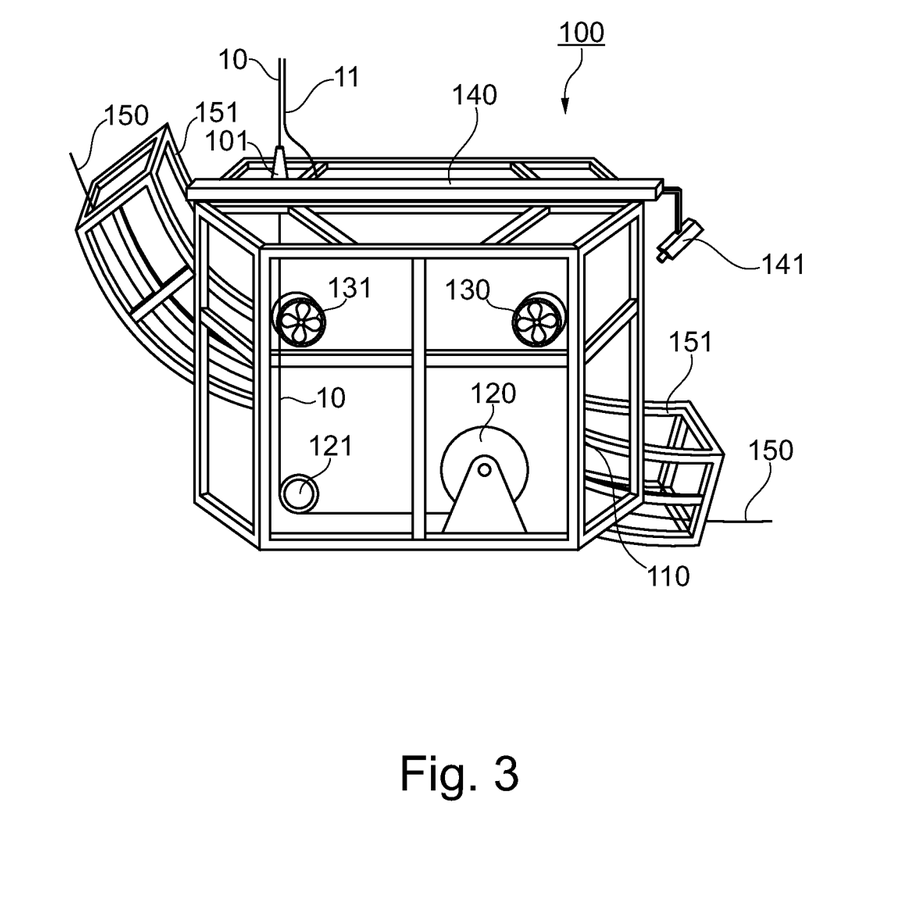
FIG. 3 depicts a first embodiment of an apparatus according to the invention.

FIG. 3 shows a first embodiment of the apparatus 100 comprising a framework 110 that allows it to be towed through the water with minimal resistance. The towing cable 10 is typically an umbilical comprising a stress member and one or more auxiliary lines 11 for power supply and communications. A winch 120 and pulley system 121 is connected to the towing cable 10 through the towing connector 101. Rotating the winch 120 in opposite directions reels in, respectively out, towing cable 10 to provide a vertical motion in the water. For this reason, the towing cable 10 and auxiliary line 11 are illustrated as two separate lines. However, it is understood that the mechanical towing cable 10, power supply lines and communication lines in a practical implementation are provided within one umbilical for all the distance from the vessel 1 to the apparatus 100 except for, say, the last 50-100 meters where the towing cable 10 is spooled on or off to maintain the vertical height.

By controlling the height above seafloor with a winch 120 provided on the ROSP, one does not need to account for slack, tension etc in the towing cable. This is particularly important at large depths, where the towing cable may be several kilometers long. In other words, the winch 120 (and any vertical thrusters if provided), permits a more accurate positioning than what can be achieved by controlling the height of apparatus 100 by the winch 5 aboard the vessel 1. The winch 120 can be controlled based on inputs from local sensors, e.g. a camera 141, and the associated control unit may be disposed within the apparatus 100 and/or on the vessel 1. Communication lines 11 in the towing cable may provide the required communication between a control unit on the vessel and a control unit in the apparatus 100, and the tasks may of course be distributed differently among the control units in different embodiments of the invention.

Vectorized thrusters 130, 131 provide horizontal motion in the directions transverse to the towing direction. That is, the towing cable 10 on FIG. 1 provides motion in the towing direction from right to left on FIGS. 1 and 3, whereas the thrusters 130, 131 provide motion in a transverse direction in or out of the paper plane on FIGS. 1 and 3. A similar thruster (not shown) may also provide a vertical force in order to support or aid the winch 120 in adjusting the apparatus 100 vertically in the water.

A camera boom 140 with a camera 141 may monitor the deployment of an ocean bottom cable 150. Input from the camera 141 and/or various other systems such as a sonar, an inertial navigation system etc. enables a control system (125, FIG. 5) to control the winch 120 (FIG. 5) and thrusters 130-133 (FIG. 4) to maintain the apparatus 100 at a predetermined height over the seafloor 3 and along a predetermined path, respectively.

On FIG. 3, the wire 150 or ocean bottom cable (OBC) connecting the nodes 200 is deployed from the vessel 1, and runs through a guiding frame 151 within the apparatus 100. In this embodiment, the wire 150 must be able to support the load of a relatively large number of nodes, each node having a certain negative buoyancy and each node typically being subject to a force from a subsurface current.

Regardless of the actual shape of the OBC 150 through the water between the vessel 1 and the connection point 101, the apparatus 100 ensures proper alignment of the cable or wire 150 by means of monitoring and positioning sensors providing input to a control system 125, which control vertical and horizontal positioning devices. In the exemplary embodiment shown on the drawings, the input sensors are represented by cameras 141, 142 (FIG. 4) Vertical adjustment is performed by the winch 120 and the towing cable 10. Horizontal adjustment transverse to the towing direction is provided by four vectorized thrusters 130-133 (FIGS. 3 and 4).

The towing cable 10 and winch 120 acting on the towing cable 10 provide forces in the travelling and vertical directions that are larger and less expensively provided than vertical forces provided by, for example, a vertical thruster on an ROV designed for general purposes. Thus, the present invention may deploy a heavier OBC at a lower price than what can be achieved by a conventional ROV.

While the embodiment on FIG. 3 shows one guiding frame 151, several such guiding frames may be provided side by side at a predetermined distance from each other, such that several OBCs may be deployed parallel to each other. In this manner, the number of times the towing vessel 1 passes over a survey area, and hence the deployment time and cost of energy, is greatly reduced compared to the number of passes and time required if the vessel 1 deploys one line at a time in an array of autonomous nodes 200 on the seafloor.

Figure 4:
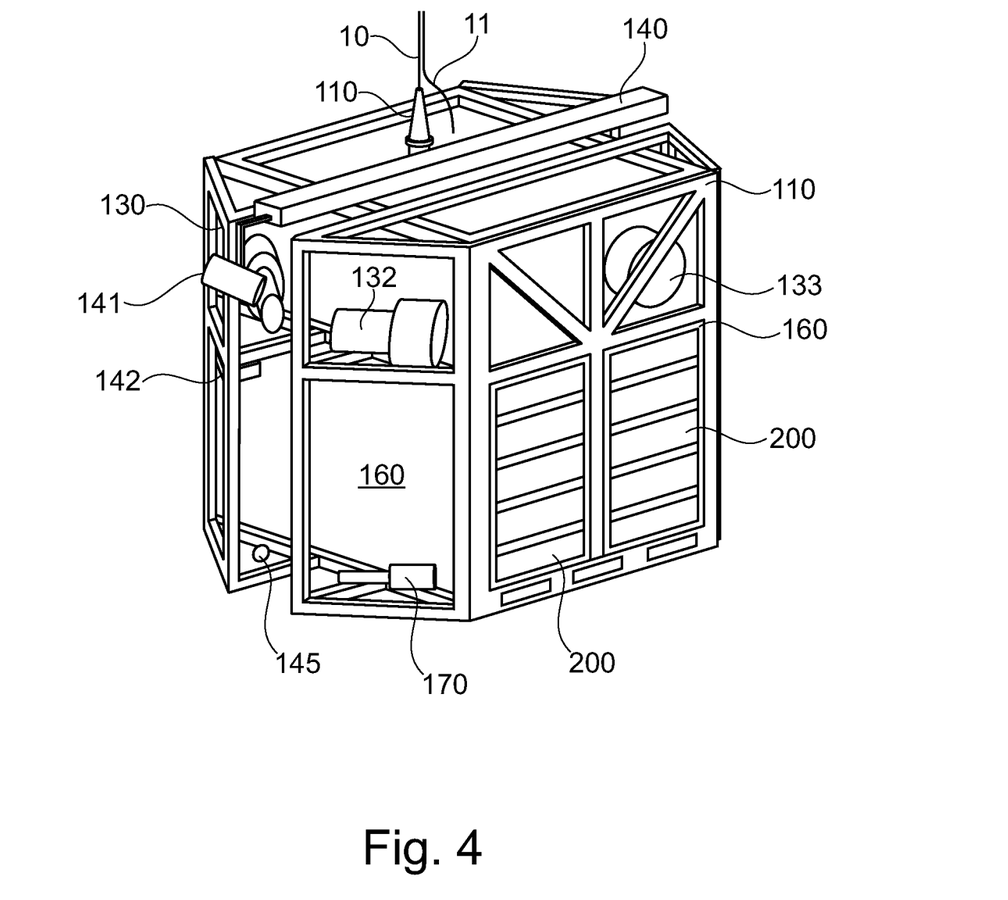
FIG. 4 is a perspective view of a second embodiment of the apparatus.

FIG. 4 shows a second embodiment of the apparatus 100 comprising a towing connector 101 (FIGS. 3 and 5) and elements 110 to 141 as described in connection with FIG. 3. In addition, FIG. 4 shows a pan and tilt camera 142 and lights 145, which also may be provided on the first embodiment shown on FIG. 3.

A main difference between the first and second embodiments is a node store 160 with an associated node handling device 170 capable of fetching the nodes 200 from the node store(s) 160 during deployment and storing the nodes 200 in the store(s) 160 during retrieval. The node handling device 170 on FIG. 4 is arranged to push the nodes 200 one at a time out of the node store(s) 160 during deployment and into the node store(s) 160 during retrieval. Any suitable mechanism designed to withdraw the nodes one at a time from the node stores during deployment and insert them one by one into the node stores during retrieval can be used with the present invention. Examples of node handling devices 170 are shown on FIGS. 7 to 11 and will be explained in greater detail below.

Figure 5:
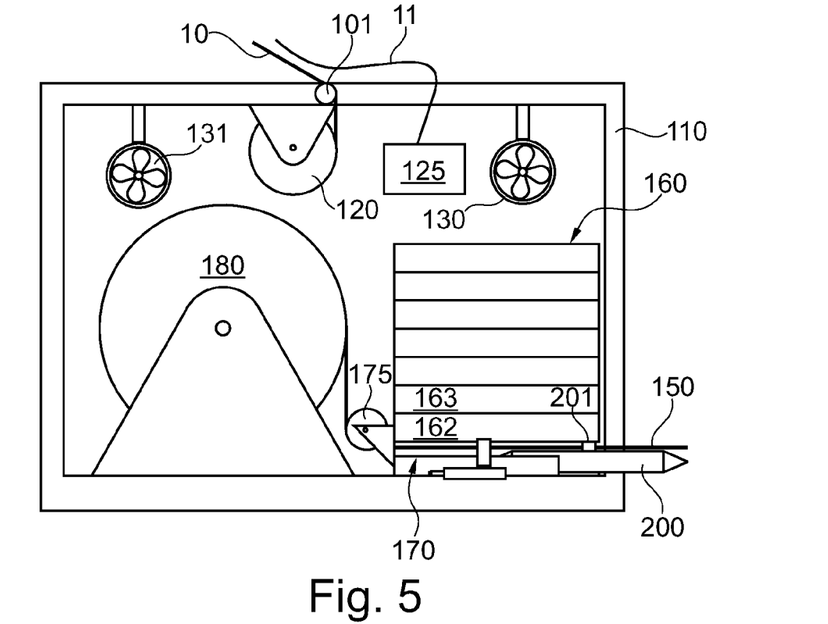
FIG. 5 is a schematic side view of the second embodiment.
Figure 6:
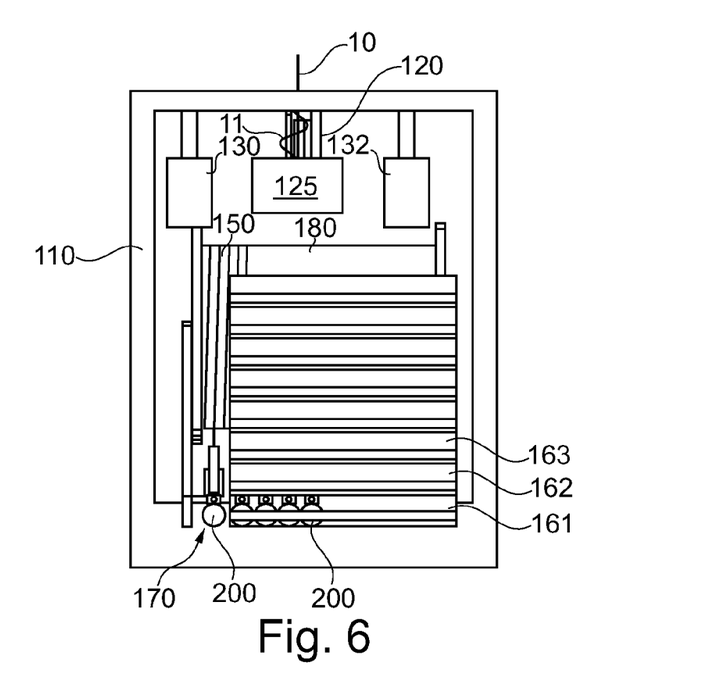
FIG. 6 is a schematic front view of the second embodiment.

FIG. 5 is a schematic view of the second embodiment viewed from a side, and FIG. 6 shows the apparatus on FIG. 5 viewed in the towing direction. The camera boom, camera(s), lights etc. are not shown on FIGS. 5 and 6. However, these and other elements are omitted from FIGS. 5 and 6 for simplicity, and are preferably present in a practical embodiment.

As shown in FIG. 5, the towing cable 10 is connected to a towing connection 101. The line 11 indicates power supply and communication lines to the vessel 1, e.g. through an umbilical, such that inputs from sensors in the apparatus 100 may be transmitted to a control system on the towing surface vessel 1 and power and control signals to the winch 120 and thrusters 130, 131 may be returned through the power supply and communication line 11.

In a preferred embodiment a control system 125 is provided within the apparatus 100. The control system 125 can take inputs from camera(s) and/or other sensors and responds by issuing control signals to the winch 120 in order to adjust the vertical position and the thrusters 130, 131 to adjust the lateral position. Preferably, the control system 125 also controls the alignment of the apparatus 100.

In particular, the winch 120 can be connected to a stress member in the towing cable 10. The arrangement is such that the winch 120 lifts the apparatus 100 from the sea floor 3 (FIG. 1) when reeling in the cable 12 and thereby pulls on towing cable 10. When the winch 120 is controlled to rotate in the opposite direction, the towing cable 10 is reeled off the winch 120 such that the apparatus 100 is lowered toward the seafloor 3. On FIGS. 5 and 6 the winch 120 is attached to upper part of frame 110 for illustrative purposes. Of course, the winch 120 may be arranged elsewhere and connect to the stress member 110 through one or more pulleys 121 as shown on FIG. 3.

In the exemplary embodiment shown in the drawings, it may be assumed that four thrusters 130-133 are provided in all instances, although some thrusters are hidden behind other element in the different figures. All four thrusters are preferably vectorized, i.e. each thruster is mounted on a vertical mounting axle. Horizontal force direction is adjusted by swinging the thruster about the vertical axis. Each thruster 130-133 is also able to rotate with a controllable speed around a horizontal axis of rotation, thereby providing a horizontal force with controllable magnitude determined by the rotational speed of the thruster. The four force vectors provided by the four thrusters can be applied to align the apparatus 100 along the predetermined path. For example, the entire apparatus 100 may be displaced to one side of the desired path. Then, the thrusters on the far side can be used to push the apparatus back to the desired path. In another example, the end closest to the vessel may be displaced to one side of the desired path and the opposite end of the apparatus may be displaced to the other side of the desired path. Then, thrusters at opposite ends of the apparatus 100 may provide forces in opposite lateral directions.

In the embodiment on FIGS. 5 and 6 a wire 150 is spooled onto a rotatable drum 180. As best seen on FIG. 5, the wire runs around a pulley 175, through the node handling device 170 toward the seafloor (not shown on FIG. 5). During retrieval, the bar 173 (FIG. 8) pushes the node 200 sideways into the node store 160 once it is received in a node receiving unit and detached from the running wire 150. During deployment, the bar 173 pulls a node from the node store 160 and attaches it to the running wire 150. The bar 173 is part of the node handling device 170 that will be described in greater detail with reference to FIGS. 7 and 8.

During deployment, the node handling device 170 fetches a node 200 from the node store 160, and a clamping device 201 attached on the node 200 grips the wire 150. The nodes 200 are attached at regular intervals, typically every 25 or 50 meters, as determined by, for example an odometer connected to the pulley 175. That is, when the pulley 175 has "rolled" 25 or 50 meters on the wire 150, a new node 200 is attached to the wire 150 by the node handling device 170.

During retrieval, nodes 200 are received in the node handling device 170 where they are oriented, detached and stored in the node store 160. As described in the paragraphs pertaining prior art, the nodes can be attached to and detached from a conveying wire 150 running through the node handling device 170 at constant speed.

One line of nodes in a patch or array (FIG. 2) may be, for example, 10 000 or 20 000 meters long. As in the first embodiment, it might be advantageous to deploy several wires in parallel to reduce the number of passes the towing vessel needs to make over the area to deploy an array of nodes 200. In order to spool as much wire 150 onto the drum 180 as possible, the wire 150 would preferably be as thin as possible. It is noted that in this second embodiment, the wire 150 need only support a few nodes 200 during deployment and retrieval as the remaining nodes either rests at the seafloor 3 or within the node store 160.

FIG. 5 is a front view of the embodiment on FIG. 5. As illustrated on FIG. 6, the nodes 200 in the lowermost row 161 of the node store 160 are oriented with their clamping devices 201 on top. The clamping devices 201 are preferably aligned with the wire 150 to facilitate rapid attachment and detachment by the node handling device 170.

The node handling device 170 may be stationary and the node store 160 may be designed such that all nodes 200 leave and enter the node store 160 through a gate at the lowermost row. For example, the node store 160 might be designed as a paternoster presenting one node 200 at a time to the node handling device 170. However, a preferred embodiment comprises a node handling lift arranged to move the pulley 175 and a node receiving unit 172 vertically between the rows of the node store 160.

Figure 7:
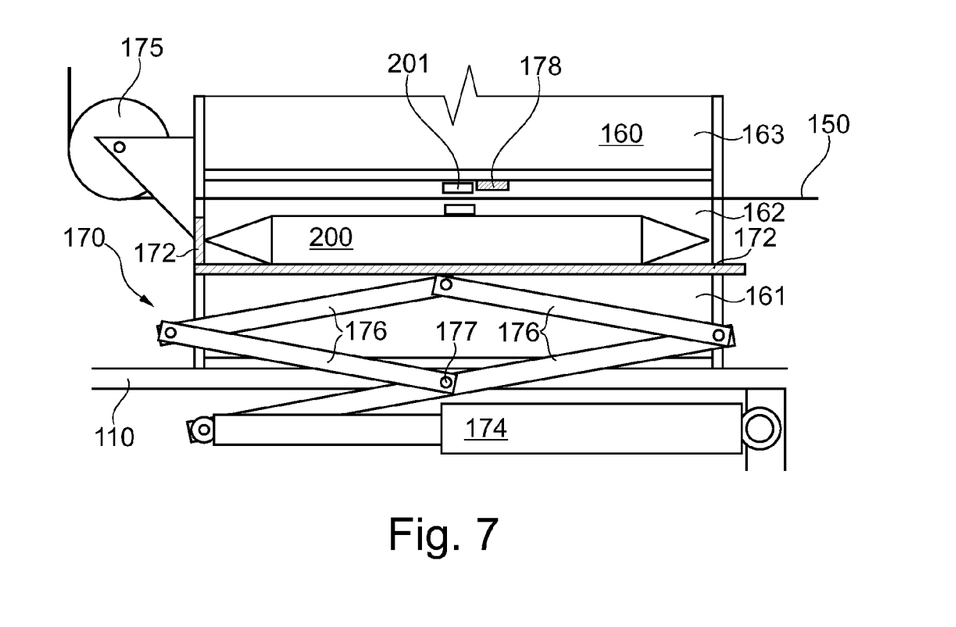
FIG. 7 is an enlarged schematic view of a node handling lift viewed from a side.

FIG. 7 shows an embodiment of such a node handling lift. The preferred way of operating the node handling device 170 is to align the node receiving unit 172 with a first row and let it remain aligned until all the nodes 200 of the row are attached to the wire 150 during deployment or detached from the wire 150 during retrieval. Then, the node handling lift aligns the node receiving unit 172 to the next row to be emptied during deployment or filled during retrieval.

For example, assume that the lowermost row 161 have been filled with nodes 200 during retrieval when the node receiving unit 172 was aligned with row 161 as in FIGS. 4 and 5. In FIG. 7, the node receiving unit 172 is lifted and aligned with row 162. The pulley 175 is attached to the node receiving unit 172 such that the wire 150 is at a fixed height above the floor of the node receiving unit 172. Thus, when the node 200 is detached from the wire 150, as illustrated with open jaws in the clamping device 201, the node may simply be pushed sideways, i.e. into the paper plane on FIG. 7, into slot 162.

In a real world implementation, any means suitable for keeping the wire 150 tight, straight and parallel to the floor of the node receiving unit 172 within the node handling device 170 can be used. That is, it is left to the skilled person to select a combination of tension springs, guides, pulleys, guides etc to ensure that the wire 150 tight, straight and parallel to the floor of the node receiving unit 172. For simplicity, such elements are omitted from the attached schematic drawings. However, elements to keep the wire 150 in the state mentioned above are well known from prior art and not discussed any further herein. As noted in connection with FIG. 2, the nodes 200 should be preferable deployed on the seafloor 3 with little or no tension in the wire 150 running between the nodes 200. Thus, the wire 150 is kept straight and tight in the node receiving unit in order to facilitate attachment or detachments only. In particular, it should not be inferred that the wire 150 pulls the nodes out of the node store 160.

Continuing the example, the wire 150 runs at constant speed as the next node 200 is pushed into the node receiving unit 172. The clamping device 201 grips firmly on the wire 150 until it is released by the release member 178. The member 178 can, for example, be a simple rod flipping a lever (not shown) on the clamping device 201 to open or close spring loaded jaws, thereby detaching or attaching the node 200 as described.

The lifting mechanism on FIG. 7 is designed as a pantograph with hinged members 176. One member 176 is extended and pivoted about a horizontal axle 177 attached to the framework 110 to form a two-armed lever. The distal end of the two-armed lever is hinged to a linear motor, e.g. a piston actuated by a hydraulic cylinder 174. With the geometry shown on FIG. 7, the node receiving unit 172 and pulley 175 are lifted when the piston retracts into the cylinder 174. Conversely, the node receiving unit 172 and pulley 175 are lowered when the piston is pushed out of the cylinder 174. It is understood that the piston and cylinder 174 on FIG. 7 can be replaced with a piston acting directly in the vertical direction, a rack and gear arrangement, wires etc. Whatever lifting mechanism is selected, it should be designed to minimize the time required to align the node receiving unit with a new row. For example, the lever arm from the pivoting axle 177 to the end of the piston in FIG. 6 could be much shorter than the lever arm within the pantograph. Then, a short displacement of the piston in the cylinder 174 would cause a relatively large vertical displacement of the node receiving unit 172 and pulley 175. In other words, pumping a relatively small amount of hydraulic oil into or put from the cylinder 174 may cause the required shift from one row in the node store 160 to an adjacent row. Thus, it is possible to design the node handling lift such that the node receiving unit is moved to and aligned with the adjacent slot between reception or deployment of two adjacent nodes while the wire 150 keeps running at constant velocity.

The logic required for rotating the drum 180 in the appropriate directions for deployment or retrieval, counting the number of nodes 200 deployed or retrieved and shifting a row by means of the node handling lift may be implemented in the control system 125, and its implementation is considered within the abilities of one skilled in the art. Hence, this logic is not described further herein.

Figure 8:
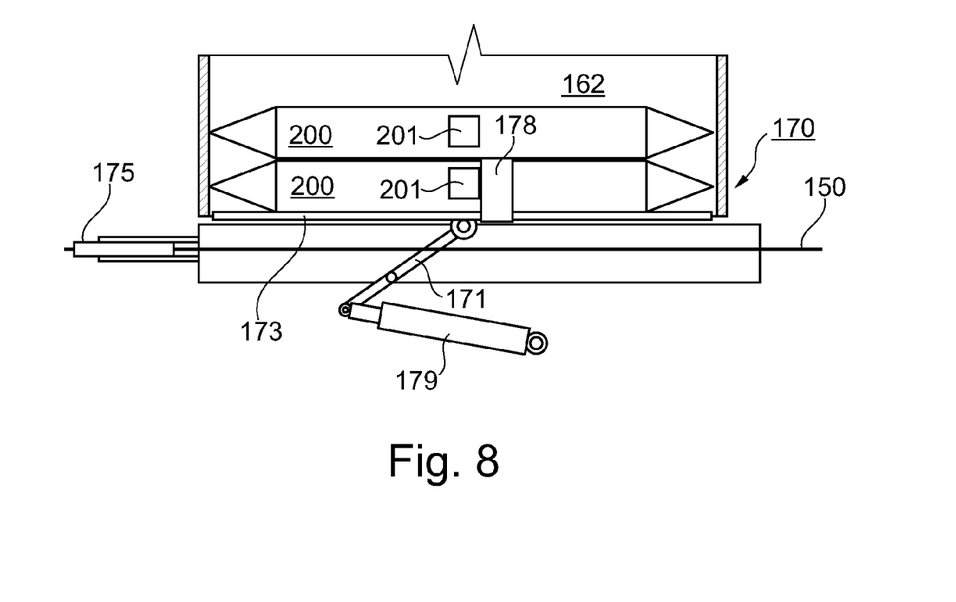
FIG. 8 is an enlarged schematic view of a node release device viewed from above.

On FIG. 8, the node store 160 of the previous figures is cut horizontally at the top of row 162 and viewed from above. Two adjacent nodes 200 with their clamping devices 201 on top are pushed into row 162 by a bar 173 connected to a two-armed lever 171. As best seen on FIG. 5, the bar 173 has a height that allows it to pass under the running wire 150. The lever 171 is pivotally attached to the floor of the node receiving unit 172. As above, the wire 150 runs continuously above the lever 171 and under the pulley 175. A piston is connected to the outer arm of the two-armed lever 171 and can be controlled to move axially within the cylinder 179. As discussed above, various alternative and well known mechanisms may be used to move an element, in this case the bar 173. Similar to the pantograph discussed above, the geometry of the two armed lever 171 and piston and cylinder 179 may be selected to provide the desired speed, e.g. the speed required to push a node 200 sideways into row 162 and retract the bar 173 before an adjacent node 200 arrives in the node receiving unit 172 attached to the continuously running wire 150 or the speed required to fetch a node 200 from the node store 160 and attach it to the wire 150, e.g. 25 or 50 meters behind the previous node during deployment.

As seen on FIG. 8, the release member 178 is attached to the bar 173 and extends transversally across one node 200. The member 178 may comprise a simple gripper that is activated during deployment such that a node 200 is received in the node receiving unit 172 when the bar 173 is retracted. In order to move the next node to within grasp of the member 178 during deployment, a pressure spring may be disposed behind the nodes in each row, i.e. a spring force acting horizontally on the nodes 200 towards the node receiving unit 172. Alternatively, the rows 161, 162, 163 etc might be inclined sufficiently to overcome friction such that the nodes would slide toward the node receiving unit 172 due to gravity. Of course, both alternatives require a retainer preventing a node from entering the node receiving unit 172 prematurely. Such retainers may, in a well known manner, be provided as stopping lips arranged such that a force acting axially against the node 200 forces the node along the lips and a guide until the node is received in the node receiving unit 172. A continued axial motion may cause a lever on the clamping device 201 to switch over such that spring activated jaws grip onto the wire 150, which in turn conveys the node from the node handling device 170 to the seafloor 3.

The node handling device 170 shown on FIGS. 6 and 7 comprises all actuators and transmissions required to deploy all nodes from a node store 160 and to store the nodes after a survey. No moving parts or mechanisms are required within the node stores. Replacing moving parts in several node stores 160 with one, common node handling device 170 decreases the cost and improves the reliability of the apparatus.

Figure 9:
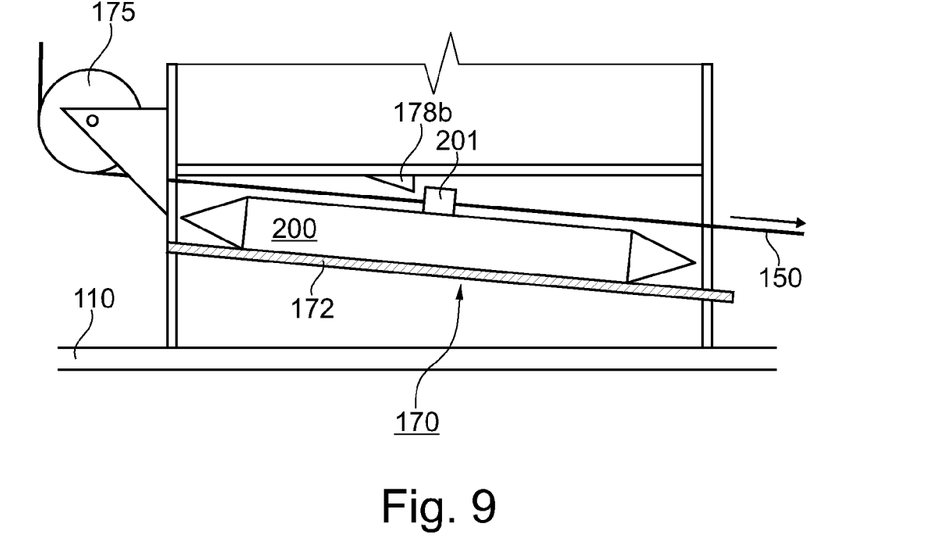
FIG. 9 shows an alternative node release device.

FIG. 9 shows an embodiment of the node handling device 170 in which the node receiving unit 172 is inclined such that gravity helps pulling the node 200 from the apparatus 100. As noted above, there should be little or no tension in the wire 150 connecting the nodes 200 when they are deployed and when they rest on the seafloor. The wire 150 is shown as a straight line in the area where the node 200 is attached, but this should not be inferred as the wire pulls the node 150 out of the apparatus. Rather, the node 200 is preferably dropped to the seafloor with little or no tension in the wire 150.

Figure 10:
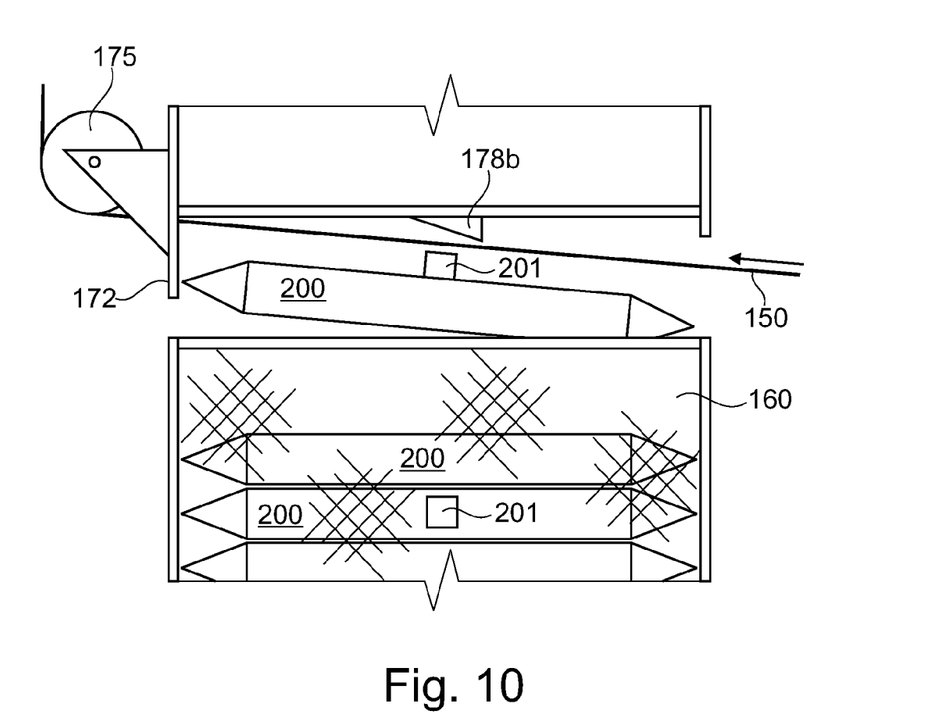
FIG. 10 illustrates an alternative retrieval technique.

FIG. 10 depicts a simplified embodiment for retrieval, in which the nodes 200 simply are dropped into a basket 160. In particular, the node 200 is released from the wire 150 once the clamping device 201 hits the release member 178. The node receiving unit 172 is provided with a wall that prevents the node 200 from passing the basket 160, and the nodes fall unordered into the basket 160. Each node has its unique ID, and its position during the survey can be determined based on this ID at a later time. Similarly, the nodes may be reloaded into a node store 160 such as that shown in FIGS. 5 and 6 at a later time. The embodiment on FIG. 10 is particularly useful during fast retrieval as described in connection with FIG. 2.

Figure 11:
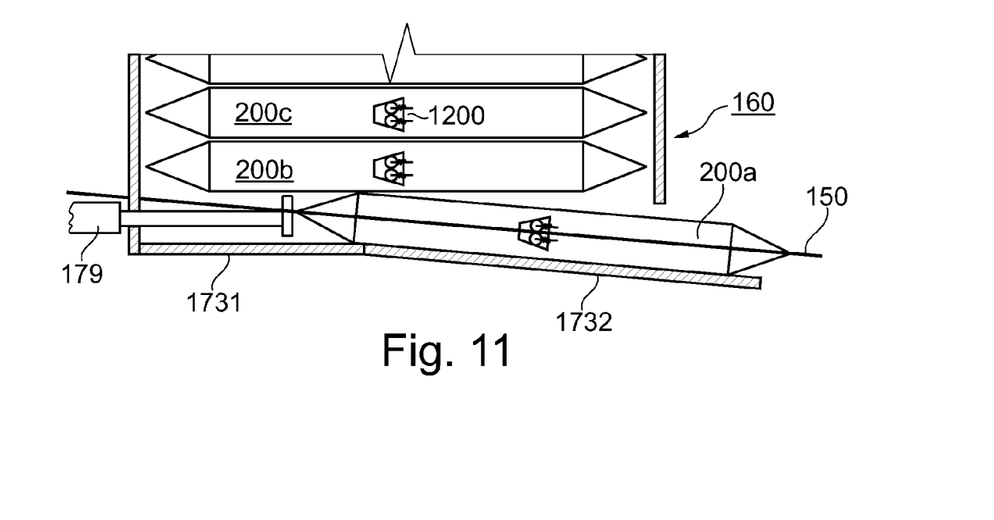
FIG. 11 is a top view of an alternative node release device.

FIG. 11 shows a node store 160 wherein nodes 200*b* and 200*c* are oriented with an alternative clamping device 1200 on top. A lip 1731 runs parallel to the stored nodes 200*b*, 200*c* and prevents the nodes from exiting sideways from the node store 160 during storage and transport. A linear actuator, represented by piston 179, is arranged to push the nodes longitudinally as illustrated by node 200*a*. Due to the inclined wall 1732 and a passage through the sidewall, the nodes 200 are allowed to exit the node store 160 one by one. On the way, the nodes are automatically attached to the running wire 150 by means of a snap lock 1200. As noted above, the wire 150 is preferably kept straight and tight in the region where the nodes are attached, but there is little or no force acting from the wire 150 on the snap lock 1200. Rather, the node 200*a* is pushed out of the node store 160 by piston 179, and thereafter drops to the sea floor. In fact, the push from piston 179 engages the snap lock 1200, whereas a pull from the downstream end of wire 150 would tend to disengage the node 200 from the wire 150.

Figure 12:
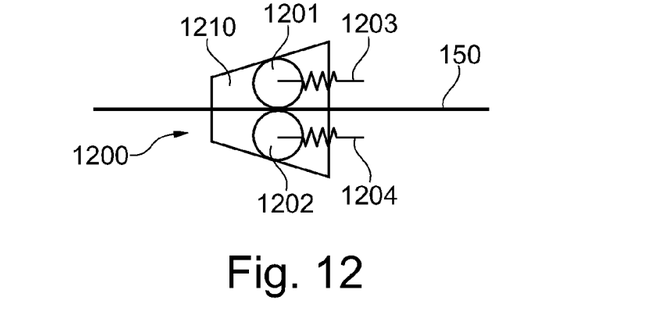
FIG. 12 illustrates a locking device for use with the invention.

FIG. 12 illustrates the principle of the snap lock on FIG. 11. The snap lock 1200 comprises two rollers 1201 and 1202 which engages either side of the wire 150. The rollers 1201 and 1202 are disposed in a funnel-shaped conduit 1210, i.e. between walls that are closer together at one end (to the left on FIG. 12) than at the other end (to the left on FIG. 12).

During retrieval, the wire 150 is pulled toward the narrower end of the funnel 1210, i.e. to the left on FIG. 12. This increases the clamping force from the rollers 1201, 1202 on the wire 150 and ensures a secure grip during retrieval. Opposite, a pull on the wire 150 toward the broader end of the funnel 1210 would decrease the clamping force. Thus, in order to release the node 200 from a running wire 150 during retrieval it suffices to push the rollers 1201, 1202 toward the broader end of the funnel, e.g. by a simple stopper such as the release member 178*b* depicted in FIG. 10.

One or more biasing springs 1203, 1204 pushes the rollers 1201, 1202 toward the narrower end of the funnel 1210, thereby providing a minimum clamping force during deployment. Of course, such a bias must be overcome by the release member 178*b* during retrieval, and the minimum clamping force should suffice to attach the node to the wire 150 during deployment.

Figure 13:
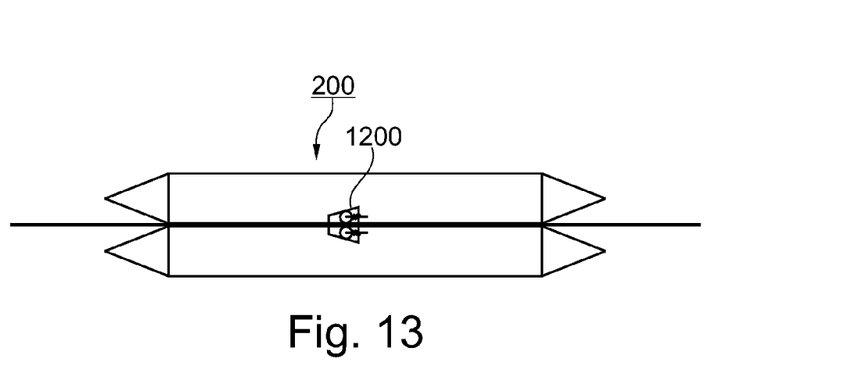
FIG. 13 illustrates a node comprising two casings arranged side by side.

FIG. 13 depicts a node 200 comprising two cylindrical casings arranged side by side. In this embodiment, the wire 150 is disposed in the longitudinal central groove between the two casings. Thus, while several figures depicts protruding clamping devices 201 and/or snap locks 1200, clamping devices that are flush and/or integral with the surface of a node are anticipated. Indeed, protruding clamping devices 201, 1200 are likely to hamper storage and handling, and would be avoided in practical embodiments. The clamping devices are protruding in the figures mainly for illustrative purposes.

While the invention has been described by way of example and certain embodiments, the scope of the invention is defined by the attached claims.

The invention claimed is:

1. An apparatus for deploying nodes along a desired path at a seafloor and retrieving seismic nodes, the apparatus comprising:
    a towing connection connecting the apparatus to a towing cable running from a towing vessel;
    vertical control means for adjusting a height over the seafloor by means of the towing cable;
    horizontal control means for adjusting a horizontal position according to a desired path;
    deployment and retrieval means for deploying and receiving seismic nodes connected to a wire at predetermined intervals along the path, comprising at least one node store adapted to receive several nodes; and
    a node handling device for connecting the nodes to the wire during deployment and disconnecting the nodes from the wire during retrieval, wherein the node handling device is constructed to fetch the nodes one by one from the node store during deployment and store the nodes one by one in the node store during retrieval.

2. The apparatus according to claim 1, wherein a rotatable drum deploying or retrieving the wire is disposed on the towing vessel.

3. The apparatus according to claim 1, wherein the deployment and retrieval means comprises a rotatable drum with the wire attached thereto, such that the wire is spooled off the drum when the drum is rotating in a deploying direction and the wire is spooled on to the drum when the drum is rotated in a retrieving direction.

4. The apparatus according to claim 1, wherein the node handling device comprises a pulley attached to a node receiving unit and means for maintaining a running wire at a constant height from the lowest point on the pulley over a floor in the node receiving unit, wherein the floor of the node receiving unit is aligned with a floor in the node store, the wire runs parallel to a longitudinal axis of the node and the wire is vertically aligned with a clamping device of a node.

5. The apparatus according to claim 4, wherein the node receiving unit is mounted on a controllable node handling lift capable of aligning the node receiving unit with a node in any row in an adjacent node store.

6. The apparatus according to claim 4, comprising a node handling lift arranged to move the pulley and a node receiving unit vertically between the rows of the node store.

7. The apparatus according to claim 1, wherein the deployment means are configured to deploy the nodes without substantial pull from the previously deployed wire.

8. The apparatus according to claim 1, wherein the nodes are pushed out of the apparatus during deployment rather than being pulled out by the wire.

9. The apparatus according to claim 1, wherein the at least one node handling device is arranged to push the nodes one at a time out of the at least one node store during deployment and into the at least one node store during retrieval.

10. The apparatus according to claim 1, wherein the at least one node store is designed as a paternoster presenting one node at a time to the node handling device.

* * * * *